(12) United States Patent
van den Berg

(10) Patent No.: US 10,097,029 B2
(45) Date of Patent: Oct. 9, 2018

(54) WIRELESS CHARGING TRANSMITTER

(71) Applicant: NXP B.V., Eindhoven (NL)

(72) Inventor: Arjan van den Berg, Helmond (NL)

(73) Assignee: NXP B.V., Eindhoven (NL)

(*) Notice: Subject to any disclaimer, the term of this patent is extended or adjusted under 35 U.S.C. 154(b) by 122 days.

(21) Appl. No.: 15/219,901

(22) Filed: Jul. 26, 2016

(65) Prior Publication Data

US 2018/0034302 A1  Feb. 1, 2018

(51) Int. Cl.
| | | |
|---|---|---|
| H02J 7/00 | (2006.01) |
| H02J 7/14 | (2006.01) |
| H01F 27/42 | (2006.01) |
| H02J 7/02 | (2016.01) |
| H02J 50/80 | (2016.01) |
| H02J 7/04 | (2006.01) |
| H02J 50/12 | (2016.01) |

(52) U.S. Cl.
CPC ............. H02J 7/025 (2013.01); H02J 7/045 (2013.01); H02J 50/12 (2016.02); H02J 50/80 (2016.02)

(58) Field of Classification Search
CPC .. H02J 7/025; H02J 7/045; H02J 50/80; H02J 50/12
USPC .................................. 320/105, 108; 307/104
See application file for complete search history.

(56) References Cited

U.S. PATENT DOCUMENTS

| | | | | |
|---|---|---|---|---|
| 9,071,126 B2* | 6/2015 | Lin | .......................... | H02M 7/06 |
| 9,118,253 B2* | 8/2015 | Telefus | ............. | H02M 3/33576 |
| 9,125,627 B2* | 9/2015 | Stein | ..................... | A61B 5/4528 |
| 9,178,369 B2* | 11/2015 | Partovi | .................... | H02J 7/025 |
| 9,203,293 B2* | 12/2015 | Telefus | ............... | H02M 1/4258 |
| 9,219,419 B2* | 12/2015 | Halberstadt | ....... | H02M 3/33515 |
| 9,843,196 B2* | 12/2017 | Kwak | ..................... | H02J 5/005 |
| 2011/0241615 A1* | 10/2011 | Yeh | ........................ | H02J 7/0027 320/108 |
| 2011/0254379 A1* | 10/2011 | Madawala | ............... | H02J 5/005 307/104 |
| 2015/0049832 A1* | 2/2015 | Noguchi | ................. | H04L 27/12 375/272 |
| 2015/0115735 A1* | 4/2015 | Singh | ................... | H04B 5/0037 307/104 |
| 2015/0372662 A1 | 12/2015 | Niessen et al. | | |

(Continued)

OTHER PUBLICATIONS

"NXQ1TXA5—One-chip 5 V Qi wireless transmitter", http://www.nxp.com/documents/short_data_sheet/NXQ1TXA5_SDS.pdf, Sep. 10, 2015, 15 pages.

*Primary Examiner* — M'Baye Diao
(74) *Attorney, Agent, or Firm* — Daniel D. Hill

(57) ABSTRACT

A wireless charging transmitter has a rectifier circuit, a transmitter coil, a transmitter coil driving circuit, and a control circuit. The rectifier circuit receives an alternating current (AC) mains input voltage and provides a rectified mains voltage. The transmitter coil is provided for inductively coupling with a receiver coil on a device having a battery to be charged. The transmitter coil driving circuit directly receives the rectified mains voltage, and for providing a time-varying driving signal to the transmitter coil. The control circuit is coupled to the transmitter coil to receive charging information from a receiver battery inductively coupled to the transmitter coil through load modulation. In response, the control circuit controls a frequency and duty cycle of the time-varying driving signal based at least in part on the charging information.

18 Claims, 1 Drawing Sheet

(56) References Cited

U.S. PATENT DOCUMENTS

2016/0001663 A1\* 1/2016 Chae ................ B60L 1/006
                                              307/9.1
2016/0056664 A1   2/2016 Partovi
2016/0359372 A1\* 12/2016 Lee ................ H02J 7/025

\* cited by examiner

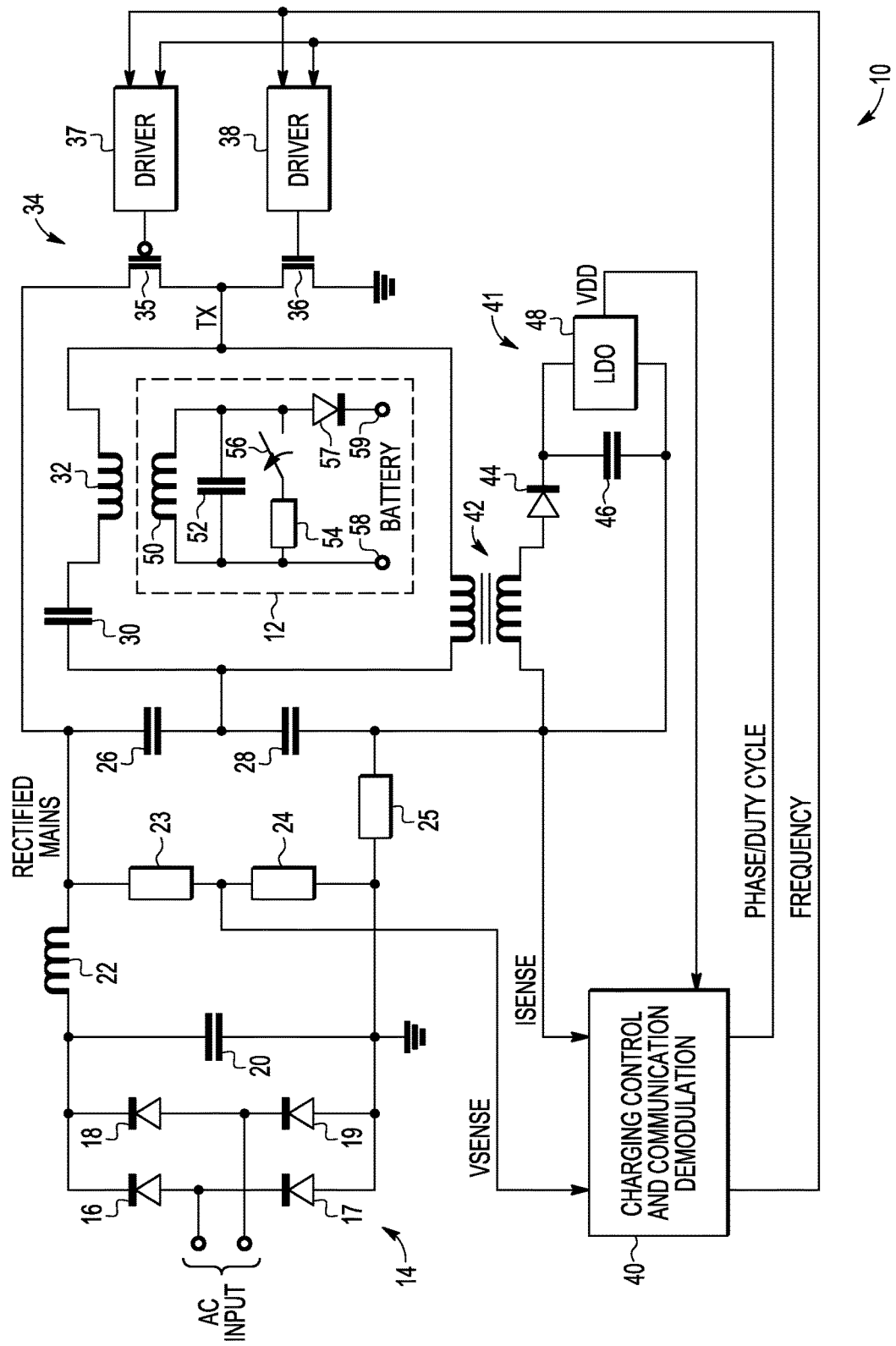

WIRELESS CHARGING TRANSMITTER

BACKGROUND

Field

This disclosure relates generally to wireless charging and more specifically to a wireless charging transmitter.

Related Art

Wireless charging allows battery charging without the use of a physical connection between the charger and the device being charged. Inductive coupling using a transmitter coil and a receiver coil is used to transfer power. The typical wireless charging transmitter uses a wall adapter to convert an AC (alternating current) mains supply voltage, such as 110 volts at 60 Hertz in the United States, to a lower DC voltage, such as 5 volts. The 5 volt DC voltage level is typically used because it is compliant with the USB standard, used for many of today's portable electronic devices such as laptop computers, tablets, and mobile phones. Wireless charging is more convenient and the wires and connectors are eliminated. However, wireless charging is not as efficient as wired charging, and the use of the wall adapter further reduces the power transfer efficiency. Therefore, a need exists for a wireless charger that is more efficient.

BRIEF DESCRIPTION OF THE DRAWINGS

The present invention is illustrated by way of example and is not limited by the accompanying FIGURES, in which like references indicate similar elements. Elements in the figures are illustrated for simplicity and clarity and have not necessarily been drawn to scale.

The FIGURE illustrates a wireless charging transmitter in accordance with an embodiment.

DETAILED DESCRIPTION

Generally, there is provided, a wireless charging transmitter that merges the wall adapter into the wireless charging transmitter for one resonant power stage by providing a rectified mains voltage directly to a half-bridge converter. Having one resonant power stage provides cost savings, improved system efficiency and power scalability.

In one embodiment, there is provided, a wireless charging transmitter comprising: a rectifier circuit for receiving an alternating current (AC) mains input voltage, and for providing a rectified mains voltage; a transmitter coil; a transmitter coil driving circuit coupled to receive the rectified mains voltage, and for providing a time-varying driving signal to the transmitter coil, the time-varying driving signal having a frequency and a duty cycle; and a communication demodulation controller coupled to the transmitter coil to receive charging information from a receiver battery inductively coupled to the transmitter coil through load modulation, and coupled to the transmitter coil driving circuit for controlling the frequency and the duty cycle of the time-varying driving signal based at least in part on the charging information. The rectifier circuit may be a full-wave rectifier. The transmitter coil driving circuit may be a half-bridge converter. The AC mains input voltage may be approximately equal to 110 volts, 60 Hertz. A frequency range of the time-varying driving signal may be about 100 kHz to about 200 kHz. The communication demodulation controller may further comprise a charging controller coupled to the transmitter coil for sensing a transmitter coil voltage and a transmitter coil current. The wireless charging transmitter may further comprise a voltage converter coupled to receive the rectified mains voltage and for providing a power supply voltage at a lower voltage level than the rectified mains voltage to power the communication demodulation controller. The power supply voltage may be in a range of about 3 to 7 volts. The voltage converter may further comprise a low drop-out voltage regulator.

In another embodiment, there is provided, a wireless charging transmitter comprising: a rectifier circuit for receiving an alternating current (AC) mains input voltage, and for providing a rectified mains voltage; a transmitter coil; a half-bridge converter circuit coupled to receive the rectified mains voltage, and for providing a time-varying driving signal to the transmitter coil, the time-varying driving signal having a frequency and a duty cycle; and a charging controller coupled to the transmitter coil for sensing a transmitter coil voltage and a transmitter coil current and for controlling the frequency and the duty cycle of the time-varying driving signal based at least in part on the sensed transmitter coil voltage and the transmitter coil current. The charging controller may further comprise communication demodulation circuitry for receiving charging information from a battery being charged by the wireless charging transmitter. The rectifier circuit may be a full-wave rectifier. The AC mains input voltage may be approximately equal to 110 volts, 60 Hertz, and wherein a frequency range of the time-varying driving signal is about 100 kilo Hertz to about 200 kilo Hertz. The wireless charging transmitter may further comprise a voltage converter coupled to receive the rectified mains voltage and for providing a power supply voltage at a lower voltage level than the rectified mains voltage to power the charging controller. The power supply voltage may be in a range of about 3 to 7 volts.

In yet another embodiment, there is provided, a wireless charging transmitter comprising: a full-wave rectifier circuit for receiving an alternating current (AC) mains input voltage, and for providing a rectified mains voltage; a transmitter coil; a half-bridge converter circuit coupled to receive the rectified mains voltage, and for providing a time-varying driving signal to the transmitter coil, the time-varying driving signal having a frequency and a duty cycle; a charging controller and communication demodulator coupled to the transmitter coil for sensing a transmitter coil voltage and a transmitter coil current and for controlling the frequency and the duty cycle of the time-varying driving signal based at least in part on the sensed transmitter coil voltage and the transmitter coil current, and at least in part on charging information from a battery being charged to regulate a transmitted power to the battery; and a voltage converter coupled to receive the rectified mains voltage and for providing a power supply voltage at a lower voltage level than the rectified mains voltage to power the charging controller. The AC mains input voltage may be approximately equal to 110 volts, 60 Hertz, and wherein a frequency range of the time-varying driving signal may be about 100 kilo Hertz to about 200 kilo Hertz. The charging controller and communication demodulator may be implemented on a single integrated circuit. The voltage converter may further comprise a low drop-out voltage regulator. The power supply voltage may be in a range of about 3 to 7 volts.

The FIGURE illustrates a wireless charging transmitter 10 in accordance with an embodiment. Wireless charging transmitter 10 includes full-wave rectifier 14, capacitors 20, 26, 28, and 30, resistive elements 23, 24, and 25, inductor 22, transmitter charging coil 32, half-bridge converter 34, charging control and communication demodulation circuit 40, and voltage converter 41. Full-wave rectifier 14 includes diodes 16, 17, 18, and 19. Half-bridge converter 34 includes P-channel transistor 35, N-channel transistor 36, and driver circuits 37 and 38. Also illustrated in the FIGURE is a receiver battery charging circuit 12 inductively coupled to wireless charging transmitter 10. Wireless battery charging receiver circuit 12 includes receiver charging coil 50, capacitor 52, resistive element 54, switch 56, diode 57, and battery connection terminals 58 and 59. Voltage converter 41 includes step-down transformer 42, diode 44, capacitor 46, and low drop-out (LDO) voltage regulator 48.

In full-wave rectifier 14, diode 16 has a first terminal and a second terminal coupled to receive alternating current (AC) mains input voltage AC INPUT. Diode 17 has a first terminal has a first terminal connected to the second terminal of diode 16, and a second terminal connected to a ground terminal. Diode 18 has a first terminal connected to the first terminal of diode 16, and a second terminal coupled to receive the AC mains input voltage AC INPUT. Diode 19 has a first terminal connected to the second terminal of diode 18, and a second terminal connected to ground. Other embodiments may use a different type of rectifier.

Capacitor 20 has a first terminal connected to the first terminals of diodes 16 and 18, and a second terminal connected to the ground terminal. In the illustrated embodiment, ground is zero volts. In other embodiments, ground may be at a different potential. Inductor 22 has a first terminal connected to the first and second terminals of diodes 16 and 18, and a second terminal for providing a rectified mains voltage labeled "RECTIFIED MAINS." Resistive elements 23 and 24 form a voltage divider. Resistive element 23 has a first terminal connected to the second terminal of inductor 22, and a second terminal. Resistive element 24 has a first terminal connected to the second terminal of resistive element 23, and a second terminal connected to the ground terminal. A voltage labeled "VSENSE" is provided from the second terminal of resistive element 23. Resistive element 25 has a first terminal connected to the ground terminal, and a second terminal. Capacitor 26 has a first terminal connected to the second terminal of inductor 22, and a second terminal. Capacitor 28 has a first terminal connected to the second terminal of capacitor 26, and a second terminal connected to the second terminal of resistive element 25.

In half-bridge converter 34, P-channel transistor 35 has a first current electrode (source) connected to the second terminal of inductor 22, a second current electrode (drain) for providing a charging voltage labeled "TX", and a control electrode (gate). N-channel transistor 36 has a first current electrode (drain) connected to the second current electrode of P-channel transistor 35, and a control electrode (gate). Driver circuit 37 has an output terminal connected to the control electrode of P-channel transistor 35, a first input terminal, and a second input terminal. Driver circuit 38 has an output terminal connected to the control electrode of N-channel transistor 36, a first input terminal and a second input terminal. Capacitor 30 has a first terminal connected to the second terminal of capacitor 26, and a second terminal. Transmitter coil 32 has a first terminal connected to the second terminal of capacitor 30, and a second terminal connected the second current electrode of P-channel transistor 35 to receive charging voltage TX.

Charging control and communication demodulation circuit 40 has a first input terminal connected to the second terminal of resistive element 23 for receiving sensed voltage VSENSE, a second input terminal connected to the second terminal of capacitor 28 for receiving a current labeled "ISENSE," and a power supply voltage terminal for receiving a power supply voltage labeled "VDD." Charging control and communication demodulation circuit 40 has a first output terminal for providing a control signal labeled "FREQUENCY" to the first input terminals of drivers 37 and 38, and a second output terminal for providing a control signal labeled "PHASE/DUTY CYCLE" to the second input terminals of drivers 37 and 38. In one embodiment, each of drivers 37 and 38 comprise an inverter. In one embodiment, charging control and communication demodulation circuit 40 is implemented on a single integrated circuit. In other embodiments, it may be implemented differently.

In voltage converter 41, transformer 42 has a first terminal connected to the second terminal of capacitor 26, a second terminal connected to the second current electrode of P-channel transistor 35, a third terminal connected to the second terminal of capacitor 28, and a fourth terminal. Diode 44 has a first terminal connected to the fourth terminal of transformer 42, and a second terminal. Low drop-out voltage regulator 48 has an input terminal connected to the second terminal of diode 44, and second input terminal connected to the second terminal of capacitor 28, and an output terminal for providing power supply voltage VDD to charging control and communication demodulation circuit 40.

Together, wireless charging transmitter 10 and wireless battery charging receiver circuit 12 for a double resonant charging system. The transmitter resonance is provided by inductor 32 and capacitor 30 and the receiver resonance is provided by inductor 50 and capacitor 52. Both resonant circuits are tuned so that the energy transferred between them is done the most efficiently. In operation, an AC mains supply voltage AC INPUT is input to full-wave rectifier 14. The AC mains supply voltage may be provided directly to rectifier 14 from a wall outlet in a house, building, or otherwise. In some locations, such as the United States, the AC mains supply voltage is generally 110 volts provided at 60 Hertz. In other locations, such as Europe, the AC mains supply voltage at a wall outlet is 220 volts provided at 50 Hertz. In other locations, the AC mains supply voltage may be different. Full-wave rectifier 14 provides rectified voltage RECTIFIED MAINS directly to half-bridge converter 34 and to transmitter coil 32. In accordance with the illustrated embodiment, a wall adapter or other form of voltage reduction is not used to reduce the mains voltage before providing the mains voltage to half-bridge converter 34, such as is done in prior art wireless chargers. Capacitors 20, 26 and 28 and inductor 22 provide protection against electromagnetic interference (EMI). Capacitors 26 and 28 function as DC blocking capacitors. Resistive element 25 is provided to measure current. An average voltage VSENSE provided by resistive elements 23 and 24, multiplied by the average current as measured through resistive element 25, approximately equals the power delivered to the battery (taking into account the efficiency of the converter). The power information may be used as a control parameter for wireless charging transmitter 10, together with current ISENSE.

A varying electromagnetic field is produced in transmitter coil 32 by driving transmitter coil 32 and capacitor 32 with a time varying voltage TX using half-bridge converter 34 in a resonant configuration. Other embodiments may use a full-bridge or other configuration. The time varying voltage TX is produced by alternately switching P-channel transistor 35 and N-channel transistor 36. A control voltage provided to each of transistors 35 and 36 by charging control and communication demodulation circuit 40 controls the frequency and duty cycle of the switching. There are various ways the switching frequency and duty cycle can be set and adjusted, and the goal is to provide the best power transfer from transmitter coil 32 to receiver coil 50 to charge a battery. Charging control and communication demodulation circuit 40 may use various criteria to control the charging, and there are several wireless charging standards, such as for example, the Qi wireless charging standard is currently most widely used. In the Qi standard, power transfer is provided in a range of about 100 kilo Hertz (kHz) to 200 kHz. Note that in other embodiments, the conductivity types of P-channel transistor 35 and N-channel transistor 36 may be different.

Half-bridge converter 34 outputs a square wave that is projected over an LC tank circuit comprising the inductance (L) of transmitter coil 32 and the capacitance (C) of capacitor 30. As stated above, the switching frequency and duty cycle of the square wave will determine how much power is transferred. Charging control and communication demodulation circuit 40 may communicate with a load coupled to receiver coil 50 in using, for example, the Qi standard. In the Qi standard, the load is modulated using switch 56 and resistive element 54. A control circuit for providing the control signal to switch 56 is not shown, but would usually be resident on a mobile device having receiver charging circuit 12. Capacitor 52 and inductor 50 provide a resonant circuit for receiver battery charging circuit 12. Resistive element 54 is provided for current modulation. Also, the actual transmitter power provided at transmitter coil 32 is calculated using a sensed voltage VSENSE provided at the voltage divider comprising resistive elements 23 and 24 and a current ISENSE through resistive element 25. Other embodiments may determine the power in a different way.

The control function provided by charging control and communication demodulation circuit 40 may be implemented using one or more integrated circuits and/or other components. In one embodiment, a suitable single integrated circuit for this control function is the NXQ1TXA5 One-chip 5 V Qi wireless transmitter available from NXP Semiconductors. To provide a lower DC (direct current) supply voltage VDD required by many integrated circuits, voltage converter 41 reduces rectified mains voltage RECTIFIED MAINS to lower voltage VDD, such as in a range of about 3 volts to 7 volts, and more specifically, 5 volts using a step-down transformer 42 and LDO 48. Other embodiments may provide DC voltage VDD a different way, and DC voltage VDD may be different.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and FIGURES are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims. Generally, in the above described embodiment, a current electrode is a source or drain and a control electrode is a gate of a metal-oxide semiconductor (MOS) transistor. Other transistor types may be used in other embodiments.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A wireless charging transmitter comprising:
   a rectifier circuit for receiving an alternating current (AC) mains input voltage, and for providing a rectified mains voltage;
   a transmitter coil;
   a transmitter coil driving circuit coupled to receive the rectified mains voltage, and for providing a time-varying driving signal to the transmitter coil, the time-varying driving signal having a frequency and a duty cycle;
   a communication demodulation controller coupled to the transmitter coil to receive charging information from a receiver battery inductively coupled to the transmitter coil through load modulation, and coupled to the transmitter coil driving circuit for controlling the frequency and the duty cycle of the time-varying driving signal based at least in part on the charging information; and
   a voltage converter coupled to receive the rectified mains voltage and for providing a power supply voltage at a lower voltage level than the rectified mains voltage to power the communication demodulation controller.

2. The wireless charging transmitter of claim 1, wherein the rectifier circuit is a full-wave rectifier.

3. The wireless charging transmitter of claim 1, wherein the transmitter coil driving circuit is a half-bridge converter.

4. The wireless charging transmitter of claim 1, wherein the AC mains input voltage is approximately equal to 110 volts, 60 Hertz.

5. The wireless charging transmitter of claim 1, wherein a frequency range of the time-varying driving signal is about 100 kHz to about 200 kHz.

6. The wireless charging transmitter of claim 1, wherein the communication demodulation controller further comprises a charging controller coupled to the transmitter coil for sensing a transmitter coil voltage and a transmitter coil current.

7. The wireless charging transmitter of claim 1, wherein the power supply voltage is in a range of about 3 to 7 volts.

8. The wireless charging transmitter of claim 1, wherein the voltage converter further comprises a low drop-out voltage regulator.

9. A wireless charging transmitter comprising:
   a rectifier circuit for receiving an alternating current (AC) mains input voltage, and for providing a rectified mains voltage;

a transmitter coil;

a half-bridge converter circuit coupled to receive the rectified mains voltage, and for providing a time-varying driving signal to the transmitter coil, the time-varying driving signal having a frequency and a duty cycle;

a charging controller coupled to the transmitter coil for sensing a transmitter coil voltage and a transmitter coil current and for controlling the frequency and the duty cycle of the time-varying driving signal based at least in part on the sensed transmitter coil voltage and the transmitter coil current; and a voltage converter coupled to receive the rectified mains voltage and for providing a power supply voltage at a lower voltage level than the rectified mains voltage to power the charging controller.

10. The wireless charging transmitter of claim 9, wherein the charging controller further comprises communication demodulation circuitry for receiving charging information from a battery being charged by the wireless charging transmitter.

11. The wireless charging transmitter of claim 9, wherein the rectifier circuit is a full-wave rectifier.

12. The wireless charging transmitter of claim 9, wherein the AC mains input voltage is approximately equal to 110 volts, 60 Hertz, and wherein a frequency range of the time-varying driving signal is about 100 kilo Hertz to about 200 kilo Hertz.

13. The wireless charging transmitter of claim 9, wherein the power supply voltage is in a range of about 3 to 7 volts.

14. A wireless charging transmitter comprising:

a full-wave rectifier circuit for receiving an alternating current (AC) mains input voltage, and for providing a rectified mains voltage;

a transmitter coil;

a half-bridge converter circuit coupled to receive the rectified mains voltage, and for providing a time-varying driving signal to the transmitter coil, the time-varying driving signal having a frequency and a duty cycle;

a charging controller and communication demodulator coupled to the transmitter coil for sensing a transmitter coil voltage and a transmitter coil current and for controlling the frequency and the duty cycle of the time-varying driving signal based at least in part on the sensed transmitter coil voltage and the transmitter coil current, and at least in part on charging information from a battery being charged to regulate a transmitted power to the battery; and a voltage converter coupled to receive the rectified mains voltage and for providing a power supply voltage at a lower voltage level than the rectified mains voltage to power the charging controller.

15. The wireless charging transmitter of claim 14, wherein the AC mains input voltage is approximately equal to 110 volts, 60 Hertz, and wherein a frequency range of the time-varying driving signal is about 100 kilo Hertz to about 200 kilo Hertz.

16. The wireless charging transmitter of claim 14, wherein the charging controller and communication demodulator is implemented on a single integrated circuit.

17. The wireless charging transmitter of claim 14, wherein the voltage converter further comprises a low drop-out voltage regulator.

18. The wireless charging transmitter of claim 14, wherein the power supply voltage is in a range of about 3 to 7 volts.

* * * * *